L. LEHMANN.
Coffee Pot.

No. 78,104.

Patented May 19, 1868.

Witnesses

Inventor
Leopold Lehmann

United States Patent Office.

LEOPOLD LEHMANN, OF MONEE, ILLINOIS.

Letters Patent No. 78,104, dated May 19, 1868.

IMPROVEMENT IN TIN-WARE.

*The Schedule referred to in these Letters Patent and making part of the same.*

TO ALL WHOM IT MAY CONCERN:

Be it known that I, LEOPOLD LEHMANN, of Monee, in the county of Will, and in the State of Illinois, have invented an Improvement in Tin-Ware; and do hereby declare that the following is a full, clear, and exact description thereof. reference being had to the accompanying drawings, making a part of this specification, in which—

Figure 1:
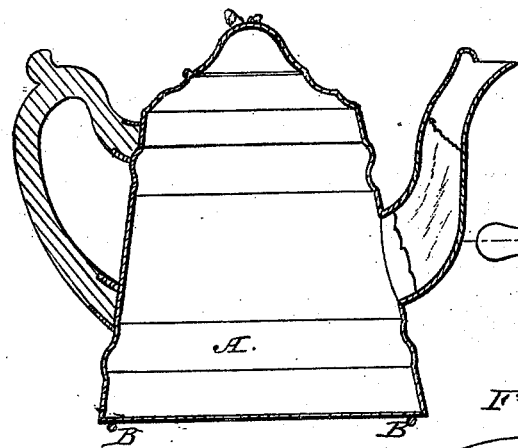
Figure 1 is a vertical section of a coffee-pot upon the line $x\ x$ in fig. 2.
Figure 2:
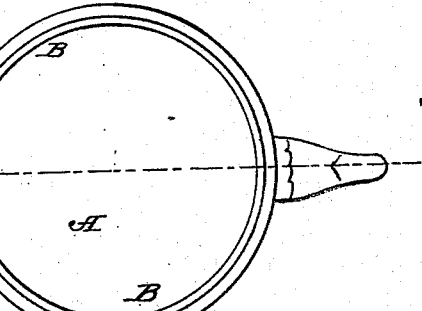
Figure 2 shows the bottom of the same.
Figure 3:
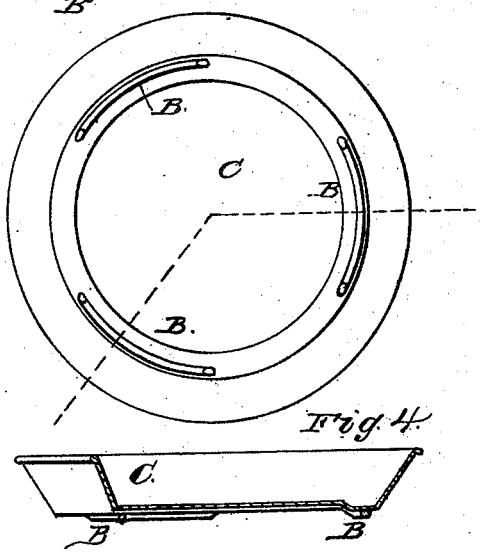
Figure 3 represents the bottom of a pan.
Figure 4:
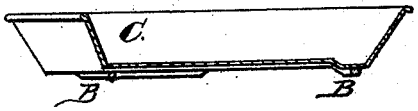
Figure 4 is a side elevation of the same, with the side broken away upon the lines $y\ y$.

My invention consists in the application of tinned wire to the flat bottoms of tin-ware, for the purpose of increasing their durability, and, in case of tin-ware used upon a stove, to avoid burning their contents, by raising the bottom, so as to leave an air-space between it and the stove.

When used for milk-pans, it allows the air to circulate freely between the pan and the shelf, by which means the milk is kept more cool, and is less liable to sour.

As represented in the drawings, A is the coffee-pot, and B the tinned wire, soldered around the bottom, near the edge.

C represents a pan, upon the bottom of which the wire, B, is soldered in three sections, leaving, between each, spaces corresponding to their length, for the passage of air underneath the pan, and also to enable it to rest more firmly upon its bottom.

The advantages claimed for this improvement over all others in use are, that, covering more surface, it strengthens and supports the bottom better, is cheaper, and more durable.

What I claim as my invention, and desire to secure by Letters Patent, is—

The application of round tinned wire to the bottoms of tin-ware, in the manner and for the purposes substantially as herein specified.

In testimony that I claim the foregoing, I have hereunto set my hand, this 28th day of February, 1868.

LEOPOLD LEHMANN.

Witnesses:
CHAS. HÖVET,
SIMON MILLER.